US012580127B2

(12) United States Patent
Kwon et al.

(10) Patent No.: US 12,580,127 B2
(45) Date of Patent: Mar. 17, 2026

(54) DIELECTRIC SLURRY COMPOSITION AND MULTILAYER ELECTRONIC COMPONENT USING SAME

(71) Applicant: SAMSUNG ELECTRO-MECHANICS CO., LTD., Suwon-si (KR)

(72) Inventors: Tae Gyun Kwon, Suwon-si (KR); So Hyeon Hong, Suwon-si (KR); Eung Seok Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 63 days.

(21) Appl. No.: 18/131,022

(22) Filed: Apr. 5, 2023

(65) Prior Publication Data

US 2024/0177930 A1 May 30, 2024

(30) Foreign Application Priority Data

Nov. 29, 2022 (KR) ........................ 10-2022-0162708

(51) Int. Cl.
*H01G 4/30* (2006.01)
*B41J 2/01* (2006.01)
(Continued)

(52) U.S. Cl.
CPC .............. *H01G 4/1227* (2013.01); *B41J 2/01* (2013.01); *C09D 11/023* (2013.01); (Continued)

(58) Field of Classification Search
CPC ........... H01G 4/1227; H01G 4/30; B41J 2/01; C09D 11/023; C09D 11/033; C09D 11/037; C09D 11/322; C09D 11/52
See application file for complete search history.

(56) References Cited

U.S. PATENT DOCUMENTS

| 12,227,672 B2 * | 2/2025 | Kwon | .................. C09D 129/04 |
| 2004/0131831 A1 * | 7/2004 | Yoshikawa | .......... H01G 4/1227 |
| | | | 428/209 |

(Continued)

FOREIGN PATENT DOCUMENTS

| JP | 2688644 | B2 * | 12/1997 |
| JP | 2001-302342 | A | 10/2001 |

(Continued)

OTHER PUBLICATIONS

JP 2688644 B2 Manufacturing Method of Multilayer Ceramic Electronic Component. (Year: 2025).*

(Continued)

*Primary Examiner* — Katarzyna I Kolb
*Assistant Examiner* — M. Reza Asdjodi
(74) *Attorney, Agent, or Firm* — MORGAN, LEWIS & BOCKIUS LLP

(57) ABSTRACT

A dielectric slurry composition according to an embodiment of the present disclosure includes: a first solution including a hydrophobic solvent and dielectric particles; and a second solution containing a hydrophilic solvent, a hydrophilic dispersant, and a hydrophilic binder, wherein at least a portion of the first solution has an emulsion structure in the second solution.

19 Claims, 6 Drawing Sheets

(51) Int. Cl.

| | | |
|---|---|---|
| *C09D 11/023* | (2014.01) |
| *C09D 11/033* | (2014.01) |
| *C09D 11/037* | (2014.01) |
| *C09D 11/322* | (2014.01) |
| *C09D 11/52* | (2014.01) |
| *H01G 4/12* | (2006.01) |

(52) U.S. Cl.
CPC .......... *C09D 11/033* (2013.01); *C09D 11/037* (2013.01); *C09D 11/322* (2013.01); *C09D 11/52* (2013.01); *H01G 4/12* (2013.01); *H01G 4/1209* (2013.01); *H01G 4/30* (2013.01)

(56) References Cited

U.S. PATENT DOCUMENTS

| | | | |
|---|---|---|---|
| 2005/0064154 A1* | 3/2005 | Aylward | G03G 7/008 |
| | | | 428/195.1 |
| 2005/0196584 A1* | 9/2005 | Halecki | B32B 27/32 |
| | | | 428/100 |
| 2006/0163073 A1* | 7/2006 | Higashihara | H01G 13/00 |
| | | | 205/70 |
| 2008/0137264 A1* | 6/2008 | Suzuki | H01G 4/30 |
| | | | 29/25.03 |
| 2009/0122462 A1* | 5/2009 | Suzuki | H01G 4/1209 |
| | | | 156/89.12 |

| | | | |
|---|---|---|---|
| 2010/0110608 A1* | 5/2010 | Wei | C04B 35/4682 |
| | | | 361/321.4 |
| 2018/0330888 A1* | 11/2018 | Shi | H01G 9/028 |
| 2022/0139624 A1* | 5/2022 | Sim | H01G 4/224 |
| | | | 361/301.4 |
| 2023/0098422 A1* | 3/2023 | Kwon | C09D 7/69 |
| | | | 29/25.03 |
| 2023/0253131 A1 | 8/2023 | Kwon et al. | |
| 2024/0177930 A1* | 5/2024 | Kwon | C09D 11/037 |
| 2024/0282524 A1* | 8/2024 | Kim | C04B 35/6262 |
| 2024/0304391 A1* | 9/2024 | Lee | C04B 35/4682 |
| 2024/0304392 A1* | 9/2024 | Lee | H01G 4/1245 |
| 2025/0279244 A1* | 9/2025 | Kowase | H01G 4/0085 |

FOREIGN PATENT DOCUMENTS

| | | | |
|---|---|---|---|
| JP | 2002-284579 A | | 10/2002 |
| JP | 2006278764 A | * | 10/2006 |
| KR | 10-2023-0043530 A | | 3/2023 |
| KR | 10-2023-0119946 A | | 8/2023 |

OTHER PUBLICATIONS

JP2006 278764 Manufacturing Method of Laminated Ceramic Electronic Component. (Year: 2025).*

* cited by examiner

FIRST
DIRECTION

SECOND
DIRECTION

I – I'

MIXING AND
SONIFICATION

P

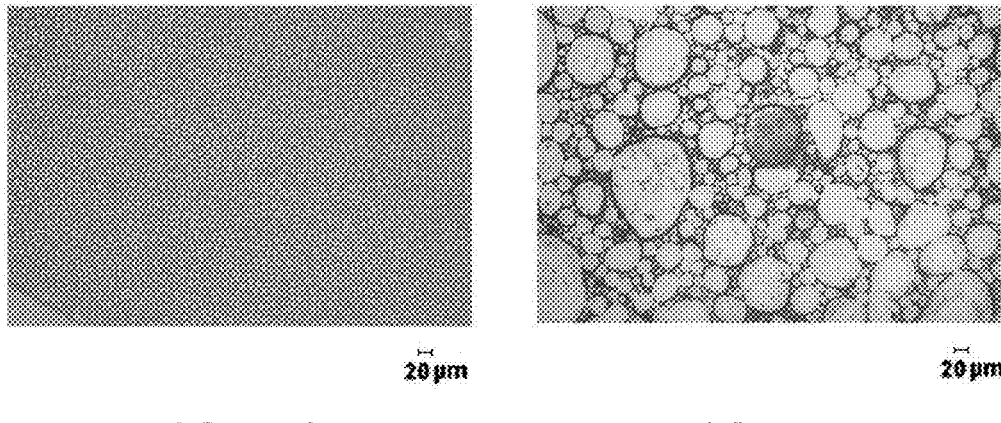
FIG. 7A                    FIG. 7B
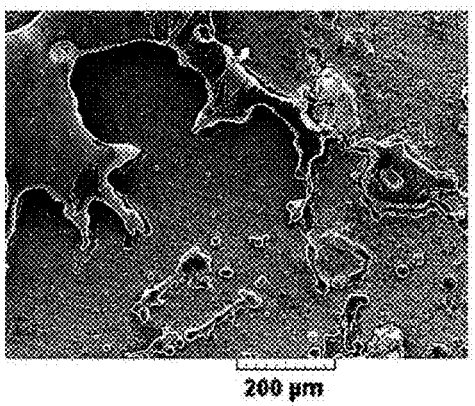
FIG. 8

1

DIELECTRIC SLURRY COMPOSITION AND MULTILAYER ELECTRONIC COMPONENT USING SAME

CROSS-REFERENCE TO RELATED APPLICATION (S)

This application claims benefit of priority to Korean Patent Application No. 10-2022-0162708 filed on Nov. 29, 2022, in the Korean Intellectual Property Office, the disclosure of which is incorporated herein by reference in its entirety.

TECHNICAL FIELD

The present disclosure relates to a dielectric slurry composition and a multilayer electronic component using the same.

A multilayer ceramic capacitor (MLCC), a multilayer electronic component, is a chip-type condenser mounted on the printed circuit boards of various types of electronic products such as imaging devices, including liquid crystal display (LCD) and a plasma display panel (PDP), computers, smartphones, and mobile phones and serves to charge or discharge electricity therein or therefrom.

The multilayer ceramic capacitor may be used as a component of various electronic devices due to having a small size, ensuring high capacity and being easily mounted. With the miniaturization and high output power of various electronic devices such as computers and mobile devices, demand for miniaturization and high capacity of stacked ceramic capacitors has also been increasing.

Currently, a multilayer ceramic capacitor (MLCC) is formed by cross-stacking internal electrode patterns using a ceramic green sheet and a conductive paste. The main components of the ceramic green sheet are ceramic powder represented by barium titanate ($BaTiO_3$) and an organic binder.

Conventionally, a dielectric slurry in which a dielectric powder is dispersed in a vehicle in which an organic binder is dissolved in an organic solvent having hydrophobicity is used. When a conductive paste is formed and a dielectric slurry is applied to a dry internal electrode pattern to form a dry ceramic green sheet using a conventional method, a sheet attack phenomenon may occur in which the organic solvent in the conductive paste swells or dissolves the organic binder in the ceramic green sheet to result in a defect. Such a sheet attack phenomenon may lead to a decrease in the insulation performance of the dielectric layer of the multilayer ceramic capacitor, which is the final product, or an increase in a short circuit occurrence rate.

In order to solve these problems, there have been attempts to use aqueous materials such as an internal electrode paste or a solvent of a dielectric slurry. However, since the degree of dispersibility of metal powder or dielectric powder varies according to the type or content of the binder and the dispersant, research into an optimal design composition is required.

On the other hand, conventionally, a tape casting method is widely used as a means of applying dielectric slurry, but in the case of tape casting, an excessive amount of time may be consumed because the dielectric slurry has to be applied after an internal electrode paste is applied and completely dried, and it may be difficult to form a layer having a very thin thickness. In contrast, inkjet printing has the advantage of applying dielectric slurry without complete drying of the internal electrode paste after application thereof, but generally, when the dielectric slurry of an organic solvent is used, a discharge inlet of an inkjet may be blocked or the inkjet may not easily be cleaned, which may cause process inconvenience.

PATENT DOCUMENT (Patent Document 1) Japanese Unexamined Patent Application Publication No. 2002-284579
(Patent Document 2) Japanese Unexamined Patent Application Publication No. 2001-302342

SUMMARY

An aspect of the present disclosure is to prevent a sheet attack phenomenon by using a dielectric slurry of an aqueous solvent.

An aspect of the present disclosure is to prevent an agglomeration phenomenon by improving dispersibility of dielectric powder particles.

However, the technical aspects of the present disclosure are not restricted to those set forth herein, and other unmentioned technical aspects will be clearly understood by one of ordinary skill in the art to which the present disclosure pertains by referencing the detailed description of the present disclosure given below.

According to an aspect of the present disclosure, a dielectric slurry composition includes: a first solution containing a hydrophobic solvent and dielectric particles; and a second solution containing a hydrophilic solvent, a hydrophilic dispersant, and a hydrophilic binder, and at least a portion of the first solution has an emulsion structure in the second solution.

According to another aspect of the present disclosure, a method for producing a multilayer electronic component includes: forming an internal electrode pattern; and inkjet-printing a dielectric slurry composition on the internal electrode pattern, while the dielectric slurry composition includes a first solution including a hydrophobic solvent and dielectric particles, and a second solution including a hydrophilic solvent, a hydrophilic dispersant, and a hydrophilic binder, and at least a portion of the first solution may have an emulsion structure in the second solution.

According to one of a variety of effects of the present disclosure, a sheet attack phenomenon can be prevented by using a dielectric slurry of an aqueous solvent.

According to one of a variety of effects of the present disclosure, an agglomeration phenomenon can be prevented by improving the dispersibility of dielectric particles.

However, various and advantageous advantages and effects of the present inventive concept are not limited to those described above and may be more easily understood in the course of describing the specific example embodiment of the present inventive concept.

BRIEF DESCRIPTION OF DRAWINGS

The above and other aspects, features, and advantages of the present disclosure will be more clearly understood from the following detailed description, taken in conjunction with the accompanying drawings, in which:

FIGS. 7A and 7B are picture images obtained by scanning the dielectric slurry according to an embodiment of the present disclosure using an OM;

FIG. 8 is a picture image obtained by scanning the dried dielectric slurry according to an embodiment of the present disclosure using an SEM.

DETAILED DESCRIPTION

Figure 1:
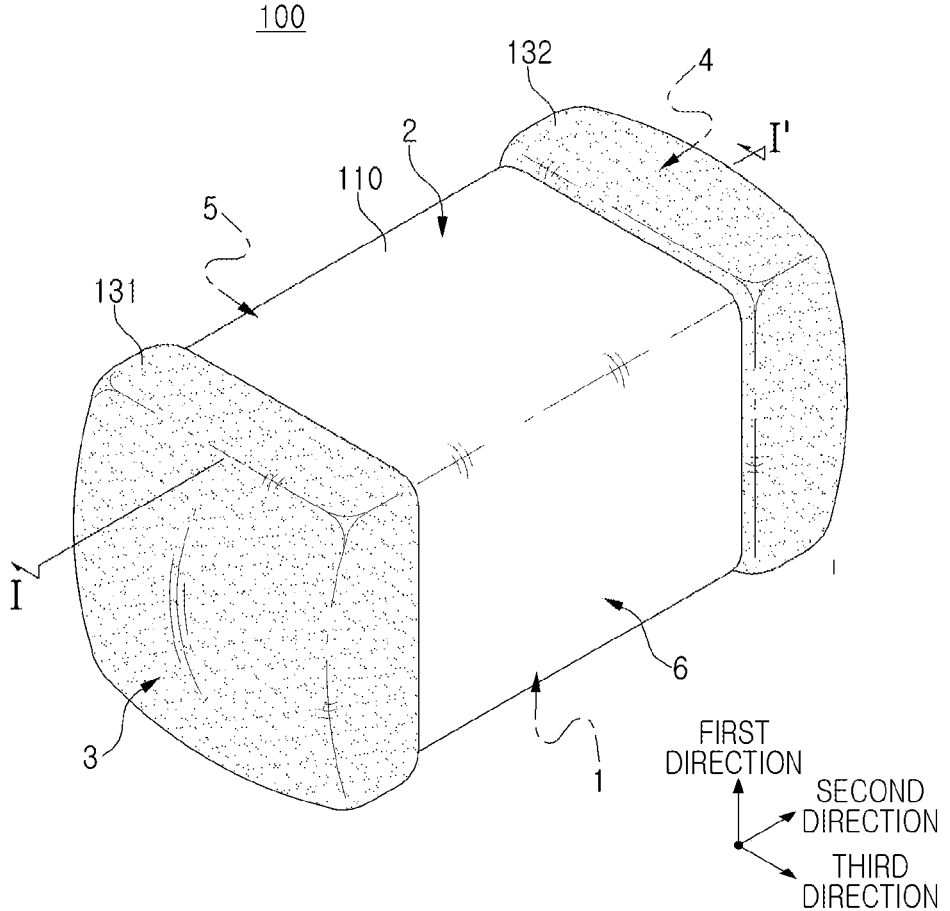
FIG. 1 is a perspective view schematically illustrating a multilayer electronic component.

Hereinafter, embodiments of the present disclosure will be described with reference to the detailed embodiments and the attached drawings. The disclosure may, however, be exemplified in many different forms and should not be construed as being limited to the specific embodiments set forth herein. In addition, the embodiments of the present disclosure are provided to more completely explain the present disclosure to one of ordinary skill in the art of the present disclosure. In the drawings, the shapes and dimensions of elements may be exaggerated for clarity, and the same reference numerals will be used throughout to designate the same or like elements.

For clear explanation of the present disclosure, portions that do not have relation to the explanation are omitted, and since sizes and thicknesses of components in the drawings are arbitrarily illustrated for convenience of explanation, the following embodiments are not limited thereto. In addition, components having the same function within the same scope are illustrated using the same reference numerals. Furthermore, throughout the specification, unless explicitly described to the contrary, the word "comprise" and variations such as "comprises" or "comprising" will be understood to imply the inclusion of stated elements but not the exclusion of any other elements.

In the drawings, a first direction may be defined as a stacking direction or a thickness T direction, a second direction may be defined as a length L direction, and a third direction may be defined as a width W direction.

Dielectric Slurry Composition

Figure 3:
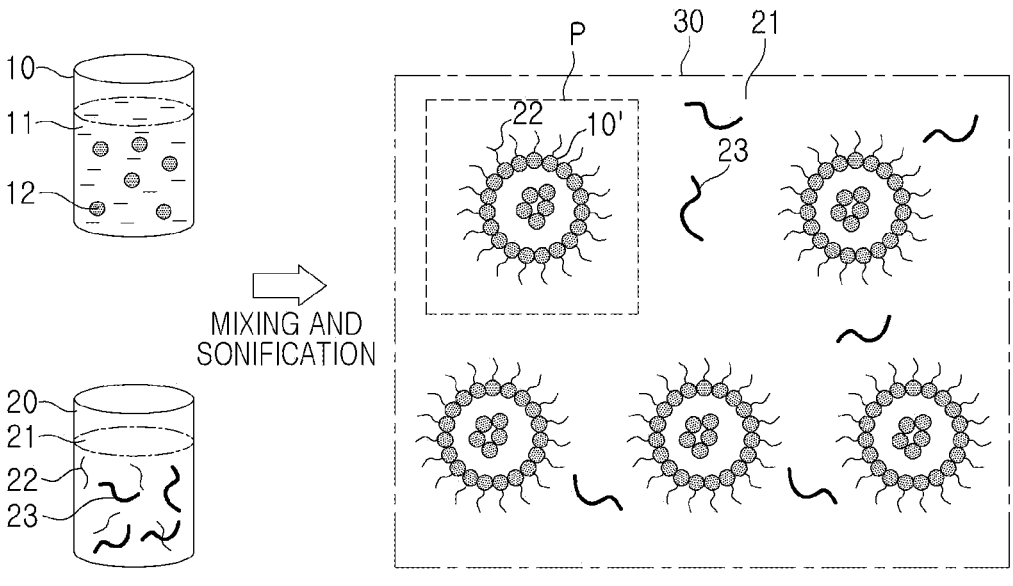
FIG. 3 schematically illustrates a dielectric slurry according to an embodiment of the present disclosure and a method for producing the same.

FIG. 3 schematically illustrates a dielectric slurry according to an embodiment of the present disclosure and a method for producing the same.

Figure 4:
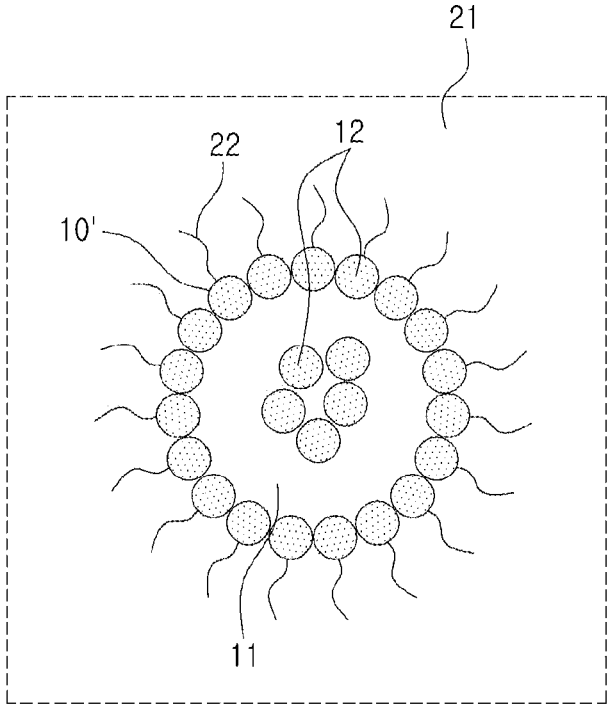
FIG. 4 schematically illustrates an enlarged view of region P of FIG. 3.

FIG. 4 schematically illustrates an enlarged view of region P of FIG. 3.

Figure 5:
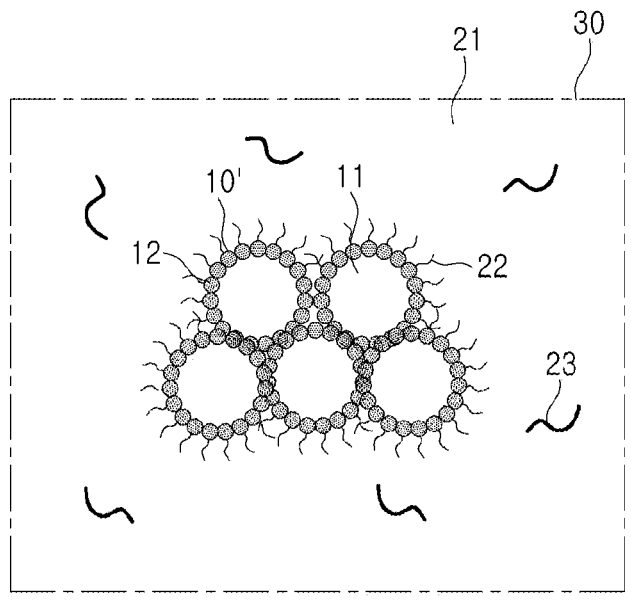
FIG. 5 schematically illustrates the dielectric slurry according to an embodiment of the present disclosure.

FIG. 5 schematically illustrates the dielectric slurry according to an embodiment of the present disclosure.

Figure 6:
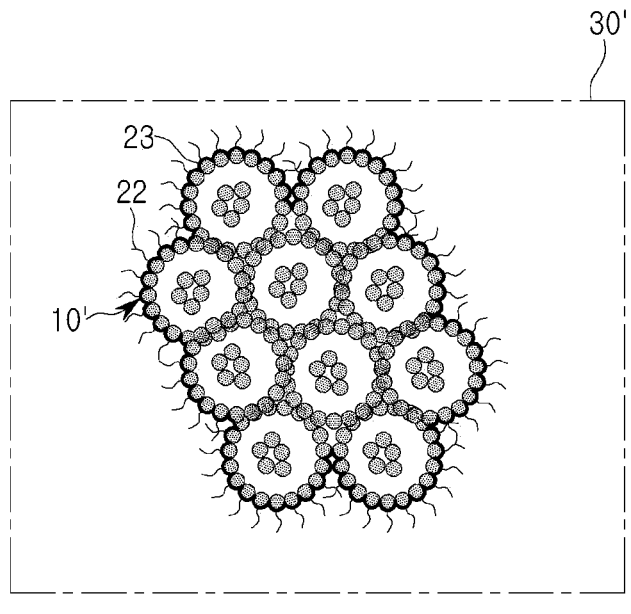
FIG. 6 schematically illustrates a state in which the dielectric slurry according to an embodiment of the present disclosure is dried.

FIG. 6 schematically illustrates a state in which the dielectric slurry according to an embodiment of the present disclosure is dried.

Hereinafter, with reference to FIGS. 3 to 6, a dielectric slurry composition according to an embodiment of the present disclosure will be described in detail.

The dielectric slurry composition 30 according to an embodiment of the present disclosure may include a first solution 10 including a hydrophobic solvent 11 and dielectric particles 12, a second solution 20 including a hydrophilic solvent 21, a hydrophilic dispersant 22 and a hydrophilic binder 23, and at least a portion of the first solution 10 may have an emulsion 10' structure in the second solution 20.

An emulsion may refer to a solution in which one solution is spread in a colloidal state to another solution, may occur between two solutions that are not mixed, and may refer to a mixture of solutions using different solvents.

In the present disclosure, the emulsion structure 10' may refer to a shape in which the first solution 10 has a plurality of droplet structures and is dispersed in the second solution 20, and one droplet structure may be described as the emulsion structure 10'.

On the other hand, as the dielectric slurry composition 30, in which the first solution 10 and the second solution 20 are mixed, is subject to sonification, the first solution 10 may be converted into the emulsion to have the emulsion structure 10'. The first solution 10 may be uniformly dispersed in the second solution 20 by stirring the dielectric slurry composition 30 through an ultrasonic treatment. Accordingly, the dielectric slurry composition 30 may include an oil-in-water emulsion structure 10' in which the first solution 10 is dispersed in the second solution 20.

In the dielectric slurry composition 30 according to an embodiment of the present disclosure, the volume ratio of the first solution 10 may be 1.0 vol % or more and 50.0 vol % or less, and the volume ratio of the second solution 20 may be 50.0 vol % or more and 99.0 vol % or less. The vol % disclosed in this paragraph are based on a total volume of the dielectric slurry composition.

That is, as the volume of the second solution 20 is higher than that of the first solution 10, the second solution 20 may surround the first solution 10 such that the first solution 10 has the emulsion structure 10', or the emulsion structure 10' in a state in which the first solution 10 is scattered (dispersed) in the second solution 20 may be more easily obtained.

The first solution 10 may include the hydrophobic solvent 11 and the dielectric particles 12.

The hydrophobic solvent 11 may include, for example, at least one of dihydro terpinyl acetate (DHTA), toluene, benzene, chloroform, hexyl acetate, and an allyl hexanoate-based hydrophobic solvent, but the present disclosure is not limited thereto, and any solvent containing a hydrocarbon chain can be used as the hydrophobic solvent 11.

Any material forming dielectric capacity may be used as the dielectric particles 12. In general, a perovskite-based material ($ABO_3$) may be used, and the dielectric particles 12 may include a state in which the additive is dissolved or diffused. A more detailed description of the dielectric particles 12 will be described below.

The first solution 10 may include 1.0 vol % or more and 80.0 vol % or less of the dielectric particles 12, and 20.0 vol % or more and 99.0 vol % or less of the hydrophobic solvent 11. The vol % disclosed in this paragraph are based on a total volume of the first solution.

When the volume ratio of the dielectric particles 12 is less than 1.0 vol %, a sufficient dielectric capacity may be difficult to secure, and when the volume ratio is more than 20.0 vol %, the dielectric particles 12 are difficult to disperse, which may make it difficult to secure a sufficient dielectric capacity due to an agglomeration phenomenon, and it may be difficult to control the shape of powder particles or grains.

When the volume ratio of the hydrophobic solvent 11 is less than 20.0 vol %, the dielectric particles 12 are difficult to disperse, which may cause an agglomeration phenomenon, and when the volume ratio is more than 99.0 vol %, it may be difficult to secure a sufficient dielectric capacity.

However, the composition of the first solution 10 is not limited thereto, and for example, various additives may be further included therein.

The second solution 20 may include the hydrophilic solvent 21, the hydrophilic dispersant 22, and the hydrophilic binder 23.

The hydrophilic solvent 21 may be any solvent capable of dissolving or swelling the hydrophilic dispersant 22 and the hydrophilic binder 23, and the present disclosure is not limited thereto. However, for example, water or dimethyl sulfoxide may be used.

The hydrophilic solvent 21 may be sufficient as long as the hydrophilic solvent 21 may dissolve or swell the hydrophilic dispersant 22 and the hydrophilic binder 23, and the present disclosure is not limited thereto. However, for example, water or dimethyl sulfoxide may be used as the hydrophilic solvent 21.

On the other hand, different types of hydrophilic solvents can be mixed and used as the hydrophilic solvent 21. However, when a single aqueous solvent is used, the dispersibility of materials in the aqueous solvent is excellent, and the single aqueous solvent is economically advantageous because mass production can be easy, and the second solution 20 may be produced using the single aqueous solvent.

The type of the hydrophilic dispersant 22 is not significantly limited as long as the type is a material having amphiphilic properties. For example, the hydrophilic dispersant 22 may include at least one of Triton X-114, Triton X-100, Brij-58, octyl glucoside, octylthio glucoside, decaethylene glycol monododecyl ether, N-decanoyl-N-methylglucamine, decyl maltopyranoside, N-dodecyl maltoside, nonaethylene glycol monododecyl ether, N-nonanoyl-N-methylglucamine, octaethylene glycol monododecyl ether, Span20, polyvinylpyrrolidone and Synperonic F108 (PEO-b-PPO-b-PEO), and any material that can be dissolved and swelled in the hydrophilic solvent 21 may be used.

The hydrophilic dispersant 22 may be adsorbed to an interface between the first solution 10 and the second solution 20. In this case, a hydrophobic group of the hydrophilic dispersant 22 may be adsorbed to the first solution 10, and a hydrophilic group may be adsorbed to the second solution 20.

When the hydrophilic dispersant 22 is adsorbed to the interface between the first solution 10 and the second solution 20, the oil-in-water emulsion structure 10' of the first solution 10 can be more stably maintained.

The hydrophilic binder 23 may use, for example, a polymer having a Hansen solubility parameter (HSP) of 10 $(cal/cm^3)^{1/2}$ or more, and may include, for example, at least one of a polyethylene glycol (PEG)-based binder such as PEG-8 stearate, a polyvinyl pyrrolidone (PVP)-based binder, and a polyvinyl alcohol (PVA)-based binder, but the present disclosure is not limited thereto.

The hydrophilic binder 23 is a component contributing to improvement of the binding property between the ceramic green sheet and particles included in an internal electrode conductive paste.

In some embodiments of the present disclosure, the second solution may include 0.1 vol % or more and 10.0 vol % or less of the hydrophilic dispersant, 5.0 vol % or more and 50.0 vol % or less of the hydrophilic binder, and 40.0 vol % or more and 94.9 vol % or less of the hydrophilic solvent.

The vol % disclosed in this paragraph are based on a total volume of the second solution.

When the hydrophilic binder 23 is mixed with the first solution 10 and is present in the dielectric slurry composition 30, the hydrophilic binder 23 does not affect the dielectric particles 12 in the first solution 10, and may serve as a matrix in which an aggregate of the dielectric particles 12 may be dispersed when drying the first solution 10.

In an embodiment of the present disclosure, the dielectric particles 12 may be disposed on an inner surface of the emulsion structure 10'.

Here, the arrangement of the dielectric particles 12 on the inner surface may refer to a form in which the dielectric particles 12 are disposed in the interface with the second solution 20 in the emulsion structure 10' of the first solution 10.

In an embodiment of the present disclosure, the dielectric particles 12 may be disposed in the emulsion structure 10'.

That is, the dielectric particles 12 may be disposed inside an interface region of the emulsion structure 10' and the second solution 20, for example, in a central region of the emulsion structure 10', rather than on the interface region.

The dielectric particles 12 is included in a shape having an emulsion structure 10', which can suppress the occurrence of agglomeration between the dielectric particles 12, and when the dielectric particles 12 are further included in the emulsion 10', structure the dielectric characteristics can be further improved as compared to the same volume.

FIGS. 7A and 7B are picture images scanned through an optical microscope (OM) according to an embodiment of the present disclosure. Other methods and/or tools appreciated by one of ordinary skill in the art, even if not described in the present disclosure, may also be used. In the dielectric slurry composition 30, it can be seen that the first solution 10 is dispersed in the emulsion structure 10' in the second solution 20. The emulsion structures 10' of various sizes and shapes may be formed according to the type and content of each material.

FIG. 7A is a picture image obtained by scanning the shape in which the dielectric particles 12 are disposed on the inner surface of the emulsion structure 10', and FIG. 7B is an image obtained by scanning the shape in which the dielectric particles 12 are disposed on the inner surface and the inner part of the emulsion structure 10'.

As illustrated in FIGS. 7A and 7B, in which the dielectric particles 12 are disposed on the inner surface and in the inner part of the emulsion structure 10', the volume or area may be larger than that of FIG. 7A in which the dielectric particles 12 are disposed only on the inner surface.

Meanwhile, referring to FIG. 6, when the dielectric slurry composition 30 including the emulsion structure 10' is dried to make a dried dielectric slurry composition 30', at least a portion of the hydrophilic dispersant 22 and the hydrophilic binder 23 of the second solution 20 may be disposed in at least one of an outer surface of the emulsion structure 10'.

While the dielectric slurry composition 30 is dried to remove the second solvent 21 included in the second solution 20, the hydrophilic dispersant 22 and the hydrophilic binder 23 may be adsorbed to the emulsion structure 10', but the present disclosure is not limited thereto.

This may vary depending on the drying temperature, but a first solvent 11 included in the first solution 10 may also be removed through a drying process. However, the present disclosure is not limited thereto.

FIG. 8 is a picture image obtained by scanning a dried dielectric slurry composition 30' using an SEM, and it may be seen that the dried residue of the first solution 10 or the emulsion structure 10' is present on a PET film.

Multilayer Electronic Component

FIG. 1 is a perspective view schematically illustrating a multilayer electronic component.

Figure 2:
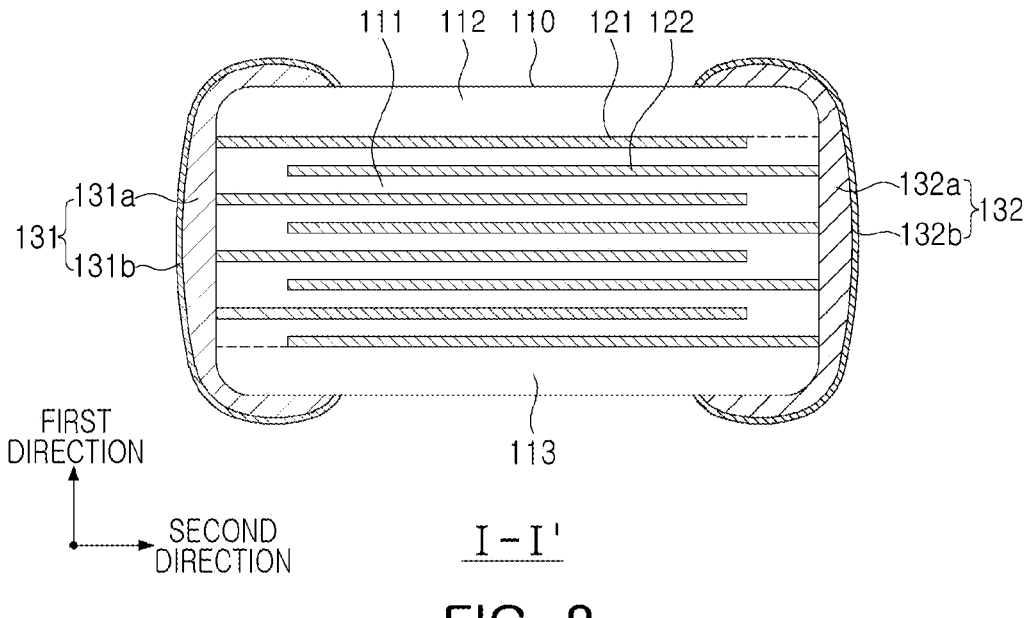
FIG. 2 is a schematic cross-sectional view taken along line I-I' of FIG. 1.

FIG. 2 is a schematic cross-sectional view taken along line I-I' of FIG. 1.

Hereinafter, referring to FIGS. 1 and 2, a multilayer electronic component produced by a method for producing the multilayer electronic component according to an embodiment of the present disclosure will be described in detail. However, although a multilayer ceramic capacitor is described as an example of the multilayer electronic component, the present disclosure may be applied to various electronic products using a dielectric composition, such as an inductor, a piezoelectric element, a varistor, or a thermistor.

In a body 110, a dielectric layer 111 and internal electrodes 121 and 122 are alternately stacked.

More specifically, the body 110 may include capacity forming portion that forms a capacity by including a first internal electrode 121 and a second internal electrode 122 disposed inside the body 110 and alternately disposed to face each other with the dielectric layer 111 interposed therebetween.

Although there is no particular limitation to the specific shape of the body 110, as illustrated, the body 110 may have a hexahedral shape or a similar shape. In the process of firing, due to the shrinkage of ceramic powder included in the body 110, the body 110 may not have a hexahedral shape with a complete straight line, but may have a substantially hexahedral shape.

The body 110 may be connected to first and second surfaces 1 and 2 facing each other in a direction, third and fourth surfaces 3 and 4 connected to the first and second surfaces 1 and 2 and facing each other in a second direction, and fifth and sixth surfaces 5 and 6 connected to the first to fourth surfaces 1, 2, 3 and 4 and facing each other in a third direction.

In a state in which a plurality of dielectric layers 111 forming the body 110 are fired, a boundary between adjacent dielectric layers 111 may be integrated to the extent that the boundary cannot be identified without using a scanning electron microscope (SEM).

A raw material forming the dielectric layer 111 is not limited as long as the material can obtain a sufficient capacitance. In general, a perovskite ($ABO_3$)-based material may be used, and for example, a barium titanate-based material, a lead composite perovskite-based material, or a strontium titanate-based material may be used. The barium titanate-based material may include $BaTiO_3$-based ceramic powder, and an example of the ceramic powder may include $(Ba_{1-x}Ca_x)TiO_3$ $(0<x<1)$, $Ba(Ti_{1-y}Ca_y)O_3$ $(0<x<1)$, $(Ba_{1-x}Ca_x)(Ti_{1-y}Zr_y)O_3$ $(0<x<1, 0<x<1)$ or $Ba(Ti_{1-y}Zr_y)O_3$ $(0<y<1)$, where calcium (Ca), zirconium (Zr), etc., are partially applied to $BaTiO_3$, $BaTiO_3$.

In addition, as materials forming the dielectric layer 111, various ceramic additives, organic solvents, binders, and dispersants may be added to powder particles such as barium titanate ($BaTiO_3$) according to the purpose of the present disclosure.

On the other hand, a way of forming the dielectric layer 111 is not particularly limited, but a tape casting way or an ink-jet printing method way may be used.

When using the inkjet printing manner using the dielectric slurry composition 30, since the hydrophilic solvent 21 is used, the discharge inlet of the inkjet may not be blocked, and since the discharge inlet of the inkjet is easily cleaned, an inkjet printer 200 can be used for a long period of time.

The thickness of the dielectric layer 111 is not particularly limited.

However, in order to more easily achieve miniaturization and high capacity of the multilayer electronic component, the thickness of the dielectric layer 111 may be 0.6 μm or less, and more preferably 0.4 μm or less.

Here, the thickness of the dielectric layer 111 may refer to a thickness of the dielectric layer 111 disposed between the first and second internal electrodes 121 and 122.

Meanwhile, the thickness of the dielectric layer 111 may refer to the size of the dielectric layer 111 in the first direction. In addition, the thickness of the dielectric layer 111 may refer to an average thickness td of the dielectric layers 111, and may refer to an average size of the dielectric layers 111 in the first direction.

The average size of the dielectric layers 111 in the first direction may be measured by scanning an image of the cross-sections of the body 110 in the first and second directions with the scanning electron microscope (SEM) of 10,000× magnification. More specifically, the average size may be an average value obtained by measuring the size in the first direction at 30 areas at which one dielectric layer 111 is spaced at equal intervals in the second direction in the scanned image. The 30 areas with the equal intervals may be designated in the capacity forming portion. In addition, when the average value is measured by extending an average value measurement up to 10 dielectric layers 111, the average size of the dielectric layers 111 in the first direction can be further generalized. Other methods and/or tools appreciated by one of ordinary skill in the art, even if not described in the present disclosure, may also be used.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

More specifically, the first internal electrode 121 may be spaced apart from the fourth surface 4 and exposed through the third surface 3, and the second internal electrode 122 may be spaced apart from the third surface 3 and exposed through the fourth surface 4. A first external electrode 131 is disposed on the third surface 3 of the body 110 and connected to the first internal electrode 121, and a second external electrode 132 is disposed on the fourth surface 4 of the body 110 and connected to the second internal electrode 122.

That is, the first internal electrode 121 may not be connected to the second external electrode 132 and may be connected to the first external electrode 131, and the second internal electrode 122 may not be connected to the first external electrode 131 and may be connected to the second external electrode 132. In this case, the first and second internal electrodes 121 and 122 may be electrically separated from each other by the dielectric layer 111 disposed therebetween.

Meanwhile, the body 110 may be formed by alternately stacking a ceramic green sheet on which the first internal electrode 121 is printed and a ceramic green sheet on which the second internal electrode 122 is printed and then firing the ceramic green sheets.

A material forming the internal electrodes 121 and 122 is not limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing an internal electrode conductive paste including at least one of nickel (Ni), copper (Cu), palladium (Pd), silver (Ag), gold (Au), platinum (Pt), tin (Sn), tungsten (W), titanium (Ti), and alloys thereof, on a ceramic green sheet. A screen-printing method or a gravure printing method may be used as a method for printing the internal electrode conductive paste, but the present disclosure is not limited thereto.

Meanwhile, the thicknesses of the internal electrodes 121 and 122 are not particularly limited.

However, in order to more easily achieve miniaturization and high capacity of the multilayer electronic component, the thickness of the internal electrodes 121 and 122 may be 0.6 μm or less, and more preferably 0.4 μm or less.

Here, the thicknesses of the internal electrodes 121 and 122 may refer to the size of the internal electrodes 121 and 122 in the first direction. In addition, the thickness of the internal electrodes 121 and 122 may refer to an average thickness te of the internal electrodes 121 and 122 and an average size of the internal electrodes 121 and 122 in the first direction.

The average size of the internal electrodes 121 and 122 in the first direction may be measured by scanning an image of the cross-sections of the body 110 in the first and second directions with the scanning electron microscope (SEM) of 10,000× magnification. More specifically, the average size may be an average value obtained by measuring the size in the first direction at 30 areas at which one internal electrode 121 or 122 is spaced at equal intervals in the second direction in the scanned image. The 30 areas with the equal intervals may be designated in the capacity forming portion. In addition, when the average value is measured by extending an average value measurement up to 10 internal electrodes 121 or 122, the average size of the internal electrodes 121 or 122 in the first direction can be further generalized. Other methods and/or tools appreciated by one of ordinary skill in the art, even if not described in the present disclosure, may also be used.

Meanwhile, the body 110 may include cover portions 112 and 113 disposed on opposite end-surfaces of the capacity forming portion in the first direction.

More specifically, the body 110 may include the upper cover portion 112 disposed in an upper part of the capacity forming portion in the first direction and the lower cover portion 113 disposed in a lower part of the capacity forming portion in the first direction.

The upper cover portion 112 and the lower cover portion 113 may be formed by stacking a single dielectric layer 111 or two or more dielectric layers 111 in the first direction in the upper and lower surfaces of the capacity forming portion, respectively, and may basically serve to prevent damage to the internal electrodes 121 and 122 due to physical or chemical stress.

The upper cover portion 112 and the lower cover portion 113 do not include the internal electrodes 121 and 122 and may include the same material as the dielectric layer 111. That is, the upper cover portion 112 and the lower cover portion 113 may include a ceramic material, for example, a barium titanate (BaTiO$_3$)-based ceramic material.

Meanwhile, the thicknesses of the cover portions 112 and 113 are not particularly limited.

However, in order to more easily achieve the miniaturization and high capacity of the multilayer electronic component, the thickness of the cover portions 112 and 113 may be 100 μm or less, preferably 30 μm or less, and more preferably 20 μm or less in ultra-small products.

Here, the thicknesses of the cover portions 112 and 113 may refer to the size of the cover portions 112 and 113 in the first direction. In addition, the thickness of the cover portions 112 and 113 may refer to the average thickness of the cover portions 112 and 113, and may refer to the average size of the cover portions 112 and 113 in the first direction.

The average size of the cover portions 112 and 113 in the first direction may be measured by scanning an image of the cross-sections of the body 110 in the first and second directions with the scanning electron microscope (SEM) of 10,000× magnification. More specifically, the average size may be an average value obtained by measuring the thickness at 30 areas at which one cover portion is equally spaced in the second direction in the scanned image. The 30 areas with the equal interval may be designated in the upper cover portion 112. Other methods and/or tools appreciated by one of ordinary skill in the art, even if not described in the present disclosure, may also be used.

Meanwhile, side margin portions may be disposed on opposite end-surfaces of the body 110 in the third direction.

More specifically, the side margin portions may include a first side margin portion disposed on the fifth surface 5 of the body 110 and a second side margin portion disposed on the sixth surface 6. That is, the side margin portion may be disposed on opposite end-surfaces of the body 110 in the third direction.

The side margin portion may refer to a region between opposite ends of the first and second internal electrodes 121 and 122 in the third direction and a boundary surface of the body 110, based on the cross-sections of the body 110 in the second and third direction.

The side margin portion may basically serve to prevent damage to the internal electrodes 121 and 122 due to physical or chemical stress.

The side margin portion forms the internal electrodes 121 and 122 by applying a conductive paste on the ceramic green sheet except where the side margin part will be formed, and in order to suppress a stepped part by the internal electrodes 121 and 122, the internal electrodes 121 and 122 are stacked and cut to be exposed to the fifth and sixth surfaces 5 and 6 of the body 110, and then, a single dielectric layer 111 or two or more dielectric layers 111 may be stacked on third directional opposite end-surfaces of the capacity forming portion in the third direction.

Meanwhile, the width of the first and second side margin portions are not particularly limited.

However, in order to more easily achieve the miniaturization and high capacity of the multilayer electronic component 100, the width of the first and second side margin portions may be 100 μm or less, preferably 30 μm or less, and more preferably 20 μm or less in ultra-small products.

Here, the width of the side margin portion may refer to the size of the side margin portion in the third direction. In addition, the width of the side margin portion may refer to the average width of the side margin portion, and may refer to the average size of the side margin portion in the third direction.

The average size of the side margin portion in the third direction can be measured by scanning an image of the cross-sections of the body 110 in the first and third directions with the scanning electron microscope (SEM) of 10,000× magnification. More specifically, the average size may be an average value obtained by measuring the size in the third direction at 30 areas at which one side margin portion is equally spaced in the first direction in the scanned image. The 30 areas with the equal interval may be designated in the first side margin portion. Other methods and/or tools appreciated by one of ordinary skill in the art, even if not described in the present disclosure, may also be used.

In an embodiment of the present disclosure, a structure in which a ceramic electronic component 100 has two external electrodes 131 and 132 may be described, but the number or shape of the external electrodes 131 and 132 may vary according to the shape or other purposes of the internal electrodes 121 and 122.

The external electrodes 131 and 132 may be disposed on the body 110 and connected to the internal electrodes 121 and 122.

More specifically, the external electrodes 131 and 132 may include first and second external electrodes 131 and 132 disposed on the third and fourth surfaces 3 and 4 of the body 110 and connected to the first and second internal electrodes 121 and 122, respectively. That is, the first external electrode 131 may be disposed on the third surface 3 of the body 110 and connected to the first internal electrode 121, and the second external electrode 132 may be disposed on the fourth surface 4 of the body 110 and connected to the second internal electrode 122.

The external electrodes 131 and 132 may be formed of any material having electrical conductivity, such as a metal, and may be determined in consideration of electrical characteristics and structural stability and also have a multilayer structure.

For example, the external electrodes 131 and 132 may include electrode layers 131a and 132a disposed on the body 110 and plating layers 131b and 132b disposed on the electrode layers 131a and 132a.

For example, the electrode layers 131a and 132a may be firing electrodes including conductive metals and glass, or resin-based electrodes including conductive metals and resins.

In addition, the electrode layers 131a and 132a may have a form in which the firing electrode and the resin-based electrode are sequentially formed on the body 110.

In addition, the electrode layers 131a and 132a may be formed by transferring a sheet including the conductive metal on the body 110 or by transferring a sheet including the conductive metal on the firing electrode.

The conductive metal used in the electrode layers 131a and 132a is not limited as long as the conductive metal is a material electrically connected to the internal electrodes 121 and 122 to form capacitance, and may include, for example, at least one selected from the group of nickel (Ni), copper (Cu), palladium (Pd), silver (Ag), gold (Au), platinum (Pt), tin (Sn), tungsten (W), titanium (Ti), and alloys thereof. The electrode layers 131a and 132a can be formed by applying a conductive paste prepared by adding a glass frit to the conductive metal powder and then firing the conductive paste.

The plating layers 131b and 132b serve to improve mounting characteristics.

The types of the plating layers 131b and 132b are not particularly limited, and may be single-layer plating layers 131b and 132b including at least one of nickel (Ni), tin (Sn), palladium (Pd), and alloys thereof, and may be formed of a plurality of layers.

More specifically, for example, the plating layers 131b and 132b may be a Ni plating layer or a Sn plating layer, may have a form in which the Ni plating layer and the Sn plating layer are sequentially formed on the electrode layers 131a and 132a, and may have a form in which the Sn plating layer, the Ni plating layer, and the Sn plating layer are sequentially formed on the electrode layers 131a and 132a. In addition, the plating layers 131b and 132b may include a plurality of Ni plating layers and/or a plurality of Sn plating layers.

Method for Producing Multilayer Electronic Component

The dielectric slurry composition produced according to an embodiment of the present disclosure may be used for producing a dielectric green sheet of the multilayer electronic component.

Among the descriptions of the dielectric slurry composition, a description overlapping with those described above may be omitted, and if a detailed description of the dielectric slurry composition is needed in the method of producing the multilayer electronic component, it will be further described in detail.

Figure 9:
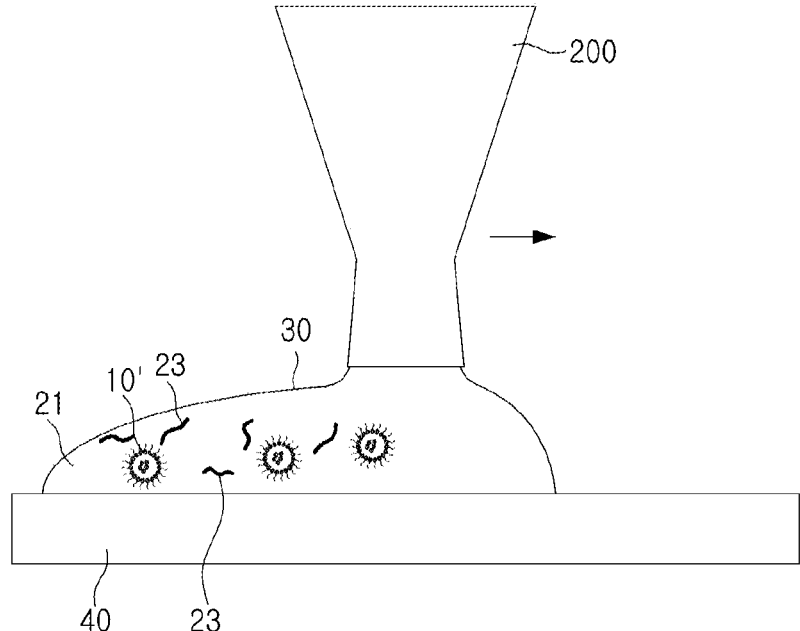
FIG. 9 schematically illustrates an operation of applying a dielectric slurry according to an embodiment of the present disclosure in an inkjet printing manner.

FIG. 9 schematically illustrates an operation of applying the dielectric slurry according to an embodiment of the present disclosure by an inkjet printing manner.

Hereinafter, with reference to FIG. 9, a method of producing the multilayer electronic component according to another embodiment of the present disclosure will be described in detail.

The method of producing the multilayer electronic component according to an embodiment of the present disclosure includes: forming an internal electrode pattern; and inkjet-printing a dielectric slurry composition on an internal electrode pattern 40, and the dielectric slurry composition 30 includes the first solution 10 containing the hydrophobic solvent 11 and the dielectric particles 12, and the second solution 20 containing the hydrophilic solvent 21, the hydrophilic dispersant 22, and the hydrophilic binder 23, and at least a portion of the first solution 10 may have the emulsion structure 10' in the second solution 20.

The operation of forming the internal electrode pattern 40 may be formed on a ceramic formed by the ceramic green sheet or the inkjet printing manner using a screen-printing method, a gravure printing method, but the present disclosure is not limited thereto.

The internal electrode pattern 40 may have a stripe shape, and may be formed by an inner electrode paste including a conductive metal.

The type of the conductive metal is not limited, and a material having excellent electrical conductivity may be used as the conductive metal. For example, the conductive metal may include at least one of nickel (Ni), copper (Cu), palladium (Pd), silver (Ag), gold (Au), platinum (Pt), tin (Sn), tungsten (W), titanium (Ti), and alloys thereof.

The conductive metal is not limited, but a material having excellent electrical conductivity may be used as the conductive metal.

Next, the operation of inkjet-printing the dielectric slurry composition 30 on the internal electrode pattern 40 may be performed.

Here, the same contents as those described above among the descriptions of the dielectric slurry composition 30 will be omitted.

FIG. 9 is a view illustrating the application of the dielectric slurry composition 30 by an inkjet manner using the inkjet printer 200.

The inkjet printer 200 may apply the dielectric slurry composition 30 to a carrier film or the internal electrode pattern 40 according to a preset pattern.

The inkjet printer 200 may print the dielectric slurry composition 30 while moving on the carrier film or the internal electrode pattern 40, and may spray the dielectric slurry composition 30 through the discharge inlet of the inkjet.

The inkjet printer 200 may include a support that supports the inkjet printer 200, an inkjet printer head that sprays the dielectric slurry composition 30 according to the preset pattern, a moving device that moves the inkjet printer head on the carrier film or the internal electrode pattern, and a circuit that executes a program controlled such that the inkjet printer head sprays the dielectric slurry composition 30 according to the preset pattern.

The inkjet printer head may print a dielectric while moving on a path according to the preset pattern, form the dielectric according to the preset pattern by adjusting the injection time and amount of the dielectric slurry composition 30, and control the thickness of the dielectric layer.

Meanwhile, the dielectric slurry composition 30 corresponds to an aqueous type, and may include the emulsion structure 10' in which the first solution 10 is uniformly dispersed in the second solution 20. Accordingly, even if the dielectric slurry composition 30 is applied on the internal electrode pattern 40, since the hydrophilic solvent 21 is not be mixed with the hydrophobic internal electrode pattern 40 of the lower layer and the hydrophobic first solution 10 is not in direct contact with the internal electrode pattern 40, the organic binder included in the internal electrode pattern 40 may not be swollen or dissolved. In addition, even if the hydrophilic second solution 20 comes into direct contact with the internal electrode pattern 40, the organic binder included in the internal electrode pattern 40 is insoluble in the second solvent 21 that is hydrophilic, thereby preventing the sheet attack phenomenon.

The dielectric particles 12 included in the dielectric slurry composition 30 may use a perovskite (ABO$_3$)-based material, and use, for example, a barium titanate-based material, a lead composite perovskite-based material, or a strontium titanate-based material. The barium titanate-based material may include a BaTiO$_3$-based ceramic powder, and an example of the ceramic powder may include (Ba$_{1-x}$Ca$_x$)TiO$_3$ (0<x<1), Ba(Ti$_{1-y}$Ca$_y$)O$_3$ (0<y<1), (Ba$_{1-x}$Ca$_x$) (Ti$_{1-y}$Zr$_y$)O$_3$ (0<x<1, 0<y<1) or Ba(Ti$_{1-y}$Zr$_y$)O$_3$ (0<y<1) in which Ca (calcium) and Zr (zirconium) are partially included in BaTiO$_3$.

The diameter of the dielectric particles 12 is not particularly limited, but may have a diameter size of 150 nm or less. Here, the diameter may refer to an average value of a minimum diameter size and a maximum diameter size passing through a center point of the dielectric particles 12.

Conventionally, when the dielectric green sheet is produced using the inkjet printing manner, the organic solvent often blocks the discharge inlet of the inkjet printing and frequently causes process failure, and since organic matters remains at the discharge inlet of the inkjet printing.

However, when the dielectric slurry composition 30 according to an embodiment of the present disclosure is used in the inkjet printing manner, since the main solvent is the hydrophilic solvent 21 of the second solution 20, the above-described problem can be solved.

In an embodiment of the present disclosure, before the inkjet printing operation, an operation of mixing the first solution 10 and the second solution 20 and subjecting to sonification and preparing the emulsion structure 10' including converting the first solution 10 into the emulsion structure may be included.

The first solution 10 can be produced to have the emulsion structure 10' in the second solution 20 to suppress the agglomeration phenomenon of the dielectric particles 12. A more detailed description thereon is the same as described above, and will be omitted.

Next, after the inkjet printing operation, an operation of drying the dielectric slurry composition may be further included. In this case, at least one of the hydrophilic dispersant 22 and the hydrophilic binder 23 of the second solution 20 may be disposed on an outer surface of the emulsion structure in the dried dielectric slurry composition.

During the drying process, the first solution 10 may maintain the emulsion structure 10' due to the hydrophilic dispersant 22 or the hydrophilic binder 23 present at a boundary surface between the first solution 10 and the second solution 20. Accordingly, even in the process of drying and removing the first solvent 11 or the second solvent 21, the dielectric particles 12, the hydrophilic dispersant 22, and the hydrophilic binder 23 may exist in a state in which the internal electrode pattern 40 and a phase are separated from each other. Accordingly, a dry coating film 30' of the dielectric slurry composition may have a shape in which aggregates of a plurality of dielectric particles 12 and the hydrophilic dispersant 22 and the hydrophilic binder 23 present on an outer surface of the aggregate of the dielectric particles 12 are uniformly covered.

The drying temperature and time are not particularly limited, but drying may be performed by applying heat for 1 minute or more under the temperature of 100° C. or higher at which the hydrophilic solvent 21 may be evaporated.

More specifically, the dry coating film 30' of the dielectric slurry composition remaining through the drying operation may include a plurality of dielectric particles 12 with the emulsion structure 10' before drying, and as described above, the dry coating film 30' may have a form in which the dielectric particles 12 are arranged on the inner surface of the emulsion structure 10' or may have form in which the dielectric particles 12 is included inside.

At least one of the hydrophilic dispersant 22 and the hydrophilic binder 23 may be arranged on at least a portion of the outer surfaces of the emulsion structure 10' after drying, and more preferably, at least one of the hydrophilic dispersant 22 and the hydrophilic binder 23 evenly surrounds the dielectric particles 12.

When the multilayer c component is produced according to an embodiment of the present disclosure, an aqueous dielectric slurry composition that does not cause damage by the sheet attack in the operation of forming the dielectric slurry composition on the internal electrode paste may be provided.

When forming the dielectric green sheet through inkjet printing manner, it is possible to form a stable dielectric slurry composition film without a fast drying process, and although the amount of the organic solvent used is very small, the agglomeration phenomenon cannot occur between the dielectric particles because the dielectric particles are trapped in the emulsion structure.

In addition, since the dielectric slurry composition corresponds to the aqueous type, its initial state is maintained for a very long period of time, which makes it easy to maintain the storage stability of the dielectric slurry composition. In addition, since most of the dielectric slurry compositions are made up of the aqueous type, the discharge inlet can be easily cleaned when used in an inkjet printer.

The expression 'an embodiment' used in this specification do not mean the same embodiment, and are provided to emphasize different unique characteristics. However, the presented embodiments do not exclude being implemented in combination features with of other embodiments. For example, even if a matter described in a particular embodiment is not described in another embodiment, it may be understood as a description related to another embodiment unless there is an explanation opposite or contradictory to the matter in another embodiment.

The terms used in the present specification are used only to describe an embodiment and are not intended to limit the present disclosure. In this case, the singular expression includes plural expressions unless the context clearly means differently.

What is claimed is:

1. A dielectric slurry composition comprising:
a first solution including a hydrophobic solvent and dielectric particles; and
a second solution including a hydrophilic solvent, a hydrophilic dispersant, and a hydrophilic binder,
wherein at least a portion of the first solution has an emulsion structure in the second solution,
wherein the second solution includes:
0.1 vol % or more and 10.0 vol % or less of the hydrophilic dispersant,
5.0 vol % or more and 50.0 vol % or less of the hydrophilic binder, and
40.0 vol % or more and 94.9 vol % or less of the hydrophilic solvent, and
wherein the hydrophilic solvent includes at least one of water or dimethyl sulfoxide
wherein the emulsion structure includes a droplet structure dispersed in the second solution.

2. The dielectric slurry composition of claim 1, wherein the dielectric particles are disposed on an inner surface of the emulsion structure.

3. The dielectric slurry composition of claim 2, wherein the dielectric particles are disposed in the emulsion structure.

4. The dielectric slurry composition of claim 1, wherein a volume ratio of the first solution is 1.0 vol % or more and 50.0 vol % or less, and a volume ratio of the second solution is 50.0 vol % or more and 99.0 vol % or less.

5. The dielectric slurry composition of claim 1, wherein the hydrophilic solvent of the second solution is a single solvent.

6. The dielectric slurry composition of claim 1, wherein the first solution includes:
1.0 vol % or more and 80.0 vol % or less of the dielectric particles and
20.0 vol % or more and 99.0 vol % or less of the hydrophobic solvent.

7. The dielectric slurry composition of claim 1, wherein the hydrophilic solvent includes water.

8. The dielectric slurry composition of claim 7, wherein the hydrophobic solvent includes at least one of dihydro terpinyl acetate (DHTA), toluene, benzene, chloroform, hexyl acetate, or an allyl hexanoate-based solvent.

9. The dielectric slurry composition of claim 8, wherein the dielectric particles include a barium titanate-based material, a lead composite perovskite-based material, or a strontium titanate-based material.

10. The dielectric slurry composition of claim 1, wherein the emulsion structure includes a droplet structure dispersed in the second solution.

11. A method of producing a multilayer electronic component, the method comprising:
forming an internal electrode pattern; and
inkjet-printing a dielectric slurry composition on the internal electrode pattern,
wherein the dielectric slurry composition includes:
a first solution including a hydrophobic solvent and dielectric particles, and
a second solution including a hydrophilic solvent, a hydrophilic dispersant and a hydrophilic binder,
wherein at least a portion of the first solution has an emulsion structure in the second solution,
wherein the second solution includes:
0.1 vol % or more and 10.0 vol % or less of the hydrophilic dispersant,
5.0 vol % or more and 50.0 vol % or less of the hydrophilic binder, and
40.0 vol % or more and 94.9 vol % or less of the hydrophilic solvent, and
wherein the hydrophilic solvent includes at least one of water or dimethyl sulfoxide.

12. The method of producing a multilayer electronic component of claim 11, wherein the emulsion structure includes a droplet structure dispersed in the second solution.

13. The method of producing a multilayer electronic component of claim 11, wherein the dielectric particles are disposed on an inner surface of the emulsion structure.

14. The method of producing a multilayer electronic component of claim 13, wherein the dielectric particles are disposed in the emulsion structure.

15. The method of producing a multilayer electronic component of claim 11, wherein a volume ratio of the first solution is 1.0 vol % or more and 50.0 vol % or less, and a volume ratio of the second solution is 50.0 vol % or more and 99.0 vol % or less.

16. The method of producing a multilayer electronic component of claim 11, wherein the hydrophilic solvent of the second solution is a single solvent.

17. The method of producing a multilayer electronic component of claim 11, wherein the first solution includes:
1.0 vol % or more and 80.0 vol % or less of the dielectric particles and
20.0 vol % or more and 99.0 vol % or less of the hydrophobic solvent.

18. The method of producing a multilayer electronic component of claim 11, further comprising, before the inkjet-printing: mixing the first solution and the second solution, sonicating the resultant mixture, and preparing the emulsion structure including converting the at least the portion of the first solution into the emulsion structure.

19. The method of producing a multilayer electronic component of claim 11, further comprising, after the inkjet-printing: drying the dielectric slurry composition,
wherein at least one of the hydrophilic dispersant or the hydrophilic binder of the second solution is disposed on at least a portion of outer surfaces of the emulsion structure in the dried dielectric slurry composition.

* * * * *